Patented Oct. 7, 1941

2,258,376

UNITED STATES PATENT OFFICE 2,258,376

ELECTRIC SWITCHGEAR

Henry William Clothier, deceased, late of Newcastle-upon-Tyne, England, by Walter James Dean, Stafford, England, and Mary Clothier, Newcastle-upon-Tyne, England, executors, and Archibald Allan, Tynemouth, England, assignors to A. Reyrolle & Company Limited, Hebburn-on-Tyne, England, a company of Great Britain Application November 5, 1938, Serial No. 239,162
In Great Britain November 15, 1937

9 Claims. (Cl. 200—150)

This invention relates to electric switchgear, and, although not limited thereto, is more particularly concerned with high voltage switchgear employing liquid-insulated A. C. circuit-breakers.

Hydraulic operation of a switch or circuit-breaker is not wholly satisfactory since the necessity for accelerating from rest a considerable mass of liquid precludes operation at a speed sufficiently high to meet requirements in many instances. Pneumatic operation, on the other hand, gives rise to practical difficulties partly in view of the compressibility of the operating fluid and partly owing to the increased size of the switchgear necessary to provide the greater electrical clearance distances required.

An object of the present invention is to provide electric switchgear wherein relative movement of the cooperating contacts of the circuit-breaker is effected by means of a force derived from gas under pressure and transmitted through at least one liquid column to a hydraulic device for producing the relative movement of the said contacts.

A further object of the invention is to provide a convenient and compact construction of circuit-breaker unit comprising an arc control device surrounding the fixed circuit-breaker contact and immersed in insulating liquid in a tank, a tubular extension of which houses a rod of relatively light construction constituting the moving contact member of the circuit-breaker, which rod passes through a liquid-tight gland in a housing, a plunger carried by the rod being hydraulically operated within the extension for effecting longitudinal movement of the contact rod.

The invention may be carried into practice in various ways but a preferred practical arrangement, together with modifications thereof, is shown by way of example in the accompanying drawings, in which.

In the arrangement shown in Figures 1, 2, 6 and 7 each circuit-breaker unit, which is mounted within an outer metal casing A, comprises an insulating cylinder B (constructed for example of "bakelised" paper) mounted vertically within the outer casing A, by suspending it from the cover plate $A^1$ of the casing. The cylinder B is filled with oil or other insulating liquid and constitutes the main circuit-breaker tank, whilst the space within the outer casing A around the tank B may be filled with insulating liquid or insulating compound, preferably of the bituminous oil-resisting type, or alternatively with a gas under pressure. Such gas may consist of air or alternatively of a gas, such as nitrogen or carbon dioxide, which will not support combustion, or of a chemically inert gas, such as argon. The use of a compressed gas in place of the insulating compound is advantageous in so far as it reduces the amount of inflammable material in the switchgear, and if a gas such as nitrogen or carbon dioxide or argon is used, it will further help in extinguishing any fire which may happen to be initiated in the circuit-breaker tank. The pressure, which may be about two atmospheres in the case of air, is chosen to suit the gas used in order to give it a dielectric value comparable with that of the compound, so that the electrical clearances necessary (and therefore also the size of the gear) will be little, if at all, greater than when compound is used.

Figure 1:
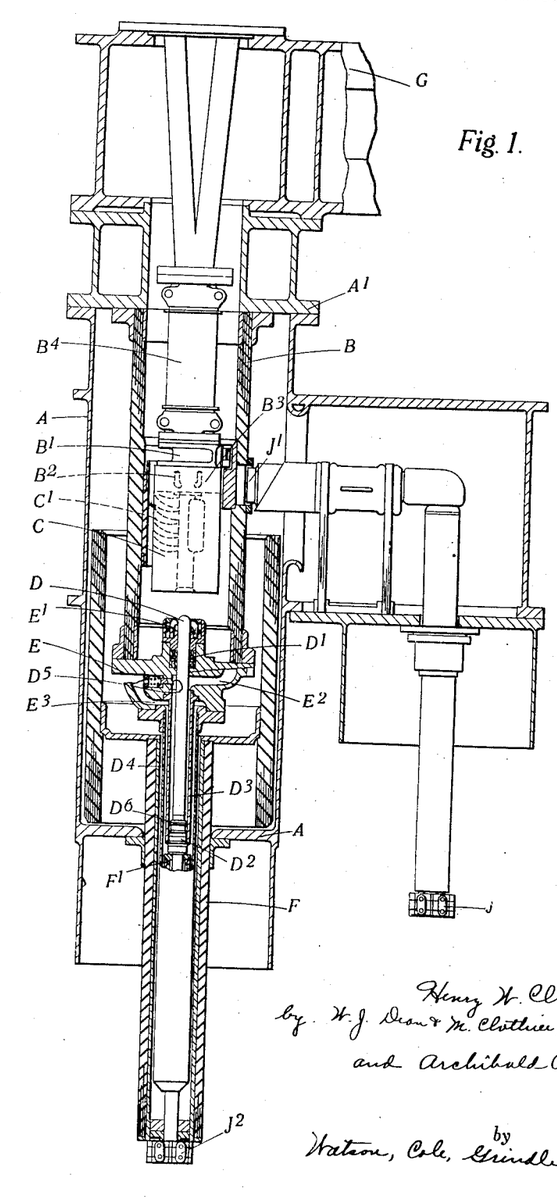
Figure 1 shows in vertical section the circuit-breaker assembly for one phase of multi-phase switchgear incorporating the invention.
Figure 6:
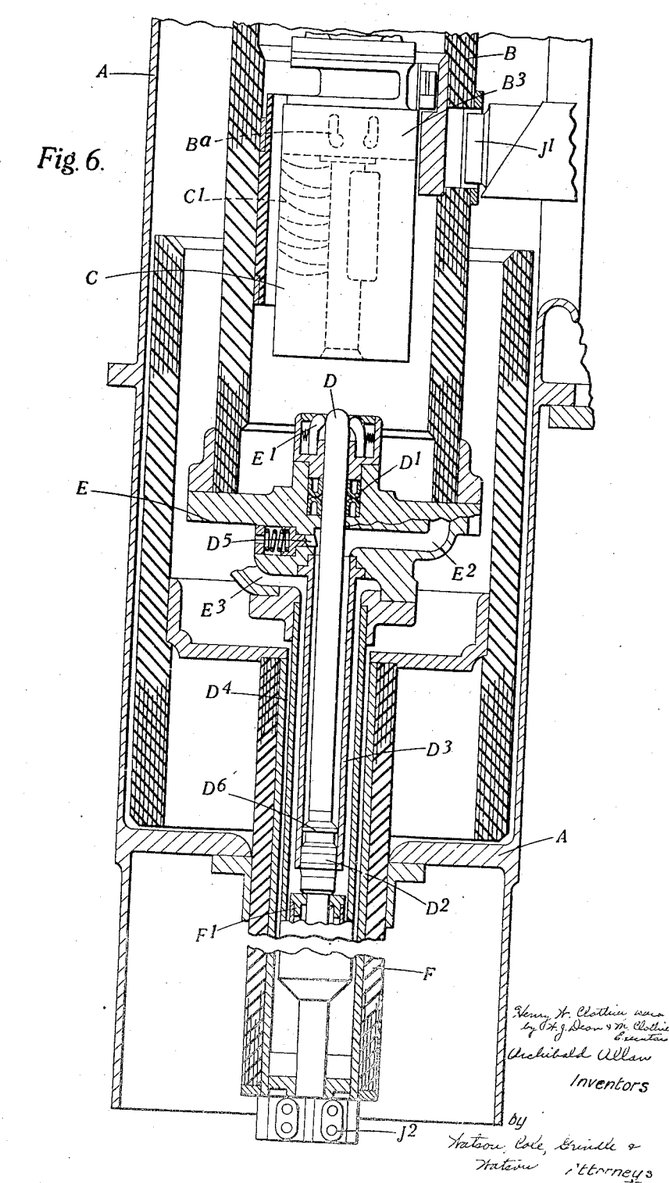
Figures 6 and 7 are enlarged views of the parts shown in Figures 1 and 2 respectively.

Supported on an insulator $B^4$ at a suitable height within the tank B is a housing $B^1$ which contains the main circuit-breaker fixed contact structure, the arrangement being such that the housing $B^1$ can be readily removed and withdrawn through the top of the tank B to facilitate contact inspection. The fixed contact structure, which may consist of a group of segmental contacts $B^2$ pressed inwardly by springs, is mounted in the housing in a metal chamber $B^3$ constituting the upper end of an arc control device C, the main laterally-vented insulating enclosure of which is secured to the underside of the housing $B^1$. The arc control device C is preferably of the kind described in one or other of British patent specifications Nos. 435,250, 435,308, 452,146 and 460,219. The moving contact of the circuit-breaker is in the form of a vertically sliding rod D which normally enters the arc control device C through a throat washer in the lower end thereof to engage with the fixed contacts $B^2$, so that on opening of the circuit-breaker the downward movement of the rod D draws out the arc close to the lateral vents $C^1$ within the arc control device C, and the relatively high pressure generated therein by the arc during the arcing period causes a blast of deionising fluid to be ejected through the arc path and through the vents $C^1$ during the zero current pause, whereby the arc is extinguished during the first cycle or the first few cycles of the alternating current wave.

The lower end of the circuit-breaker tank B is closed by another metal housing E containing spring contacts $E^1$ engaging with the sides of the moving contact rod D, the rod passing through a liquid-tight gland $D^1$ in the housing E into a liquid-filled extension vessel $D^4$ which is in turn disposed within a liquid-filled extension vessel F formed of fibre or other insulating material carried beneath the housing E and suitably supported by the lower part of the outer casing A, whereby the liquid in the circuit-breaker tank B which may become contaminated by the effects of arcing when the circuit-breaker operates is segregated from the liquid in the extension vessel $D^4$. The circuit-breaker tank B and the extension vessel $D^4$ together constitute a self-contained unit, the extension vessel $D^4$ containing means for effecting hydraulic operation of the contact rod D.

For this purpose the contact rod D is furnished with a plunger $D^2$ sliding in a cylinder $D^3$ mounted within and spaced from an outer tube $D^4$ which is in turn spaced from the extension tube F so that the upper end of the cylinder $D^3$ above the plunger $D^2$ is in open communication with a cavity $E^2$ within the housing E and the annular space around the cylinder $D^3$ is in open communication with the cylinder beneath the plunger $D^2$ and also with a cavity $E^3$ in the housing E. Two pipes $E^4$, $E^5$ (Figure 2) of insulating material for conveying oil or other insulating liquid respectively to the two sides of the plunger $D^2$ for the hydraulic operation of the contact rod D are connected to the cavities $E^2$, $E^3$.

Figure 2:
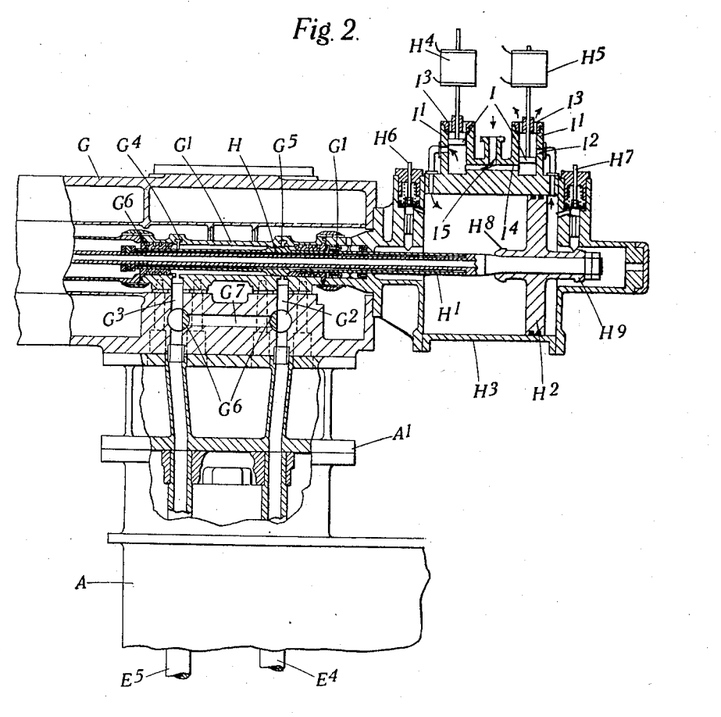
Figure 2 illustrates in section part of the hydraulic mechanism common to the several circuit-breakers.
Figure 7:
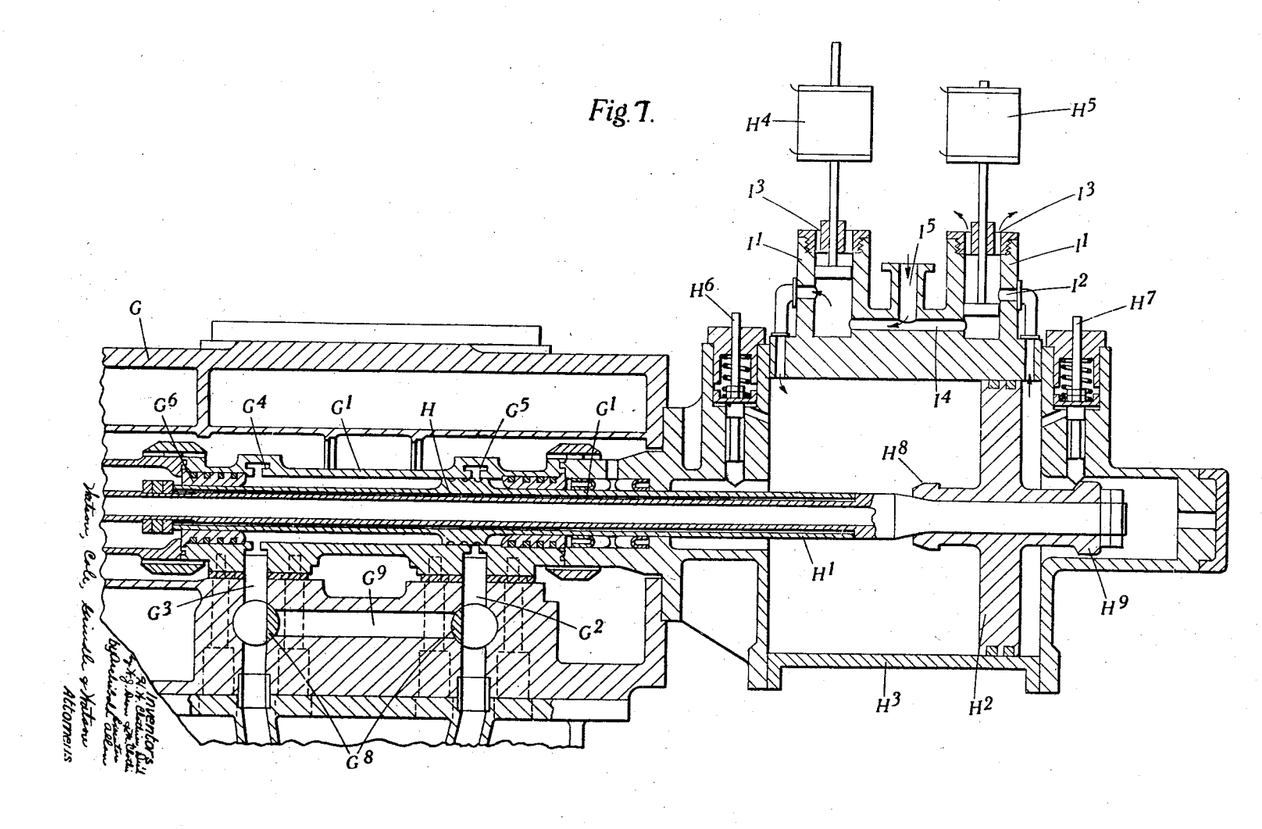

Mounted on the cover plates $A^1$ of the several circuit-breakers is a reservoir G for insulating liquid, for example oil, a cylinder $G^1$ being immersed in the said liquid within the reservoir. The cylinder $G^1$ communicates through conduits $G^2$, $G^3$ with the pipes $E^4$, $E^5$ of each circuit-breaker as shown in Figure 2. The conduits $G^2$, $G^3$ open into annular recesses $G^5$, $G^4$ in the cylinder $G^1$ adjacent to glands $G^6$, $G^7$ at the opposite ends of the stroke of an hydraulic actuating piston H mounted on a piston rod $H^1$. The piston rod $H^1$ carries a double-acting pneumatic piston $H^2$ arranged in a cylinder $H^3$ to which gas, for example air, under pressure can be supplied under the control of two electromagnetically operated valves $H^4$, $H^5$. The cylinder $H^3$ is provided with two spring-loaded latches $H^6$, $H^7$ which cooperate, as hereinafter described, with collars $H^8$, $H^9$ on the piston $H^2$.

Each of the valves $H^4$, $H^5$ comprises a piston I sliding in a cylinder $I^1$ furnished with a port $I^2$ communicating with the pneumatic cylinder $H^3$, relief ports $I^3$ leading to the atmosphere and a supply port $I^4$ leading to a common supply conduit $I^5$ connected to a gas pressure supply source. It will be understood that a suitable electrical or mechanical interlock is provided between the valves $H^4$, $H^5$ so as to ensure that when one valve establishes communication between the cylinder $H^3$, on one side of the piston $H^2$, and the supply of gas under pressure, the other valve establishes communication between the cylinder $H^3$, on the other side of the piston $H^2$, and the atmosphere.

With the parts in the positions shown the moving contact rod D is in its lower position and the circuit-breaker is open, the piston H covering the annular recess $G^5$. If now it is desired to close the circuit-breaker the valve $H^5$ is operated to establish communication between the ports $I^2$ and $I^4$, whilst the valve $H^4$ is operated to establish communication between the ports $I^2$ and $I^3$. The pressure of the air admitted to the cylinder $H^3$ through the port $I^2$ of the valve $H^5$ acts on the latch $H^7$ so as to release the piston $H^2$, which thus moves to the left. The piston H thus draws liquid through the pipe $E^4$ from the cavity $E^2$ and delivers liquid under pressure through the pipe $E^5$ to the cavity $E^3$. The plunger $D^2$ is in this way raised so that the movable contact rod D enters the arc control device C and makes contact with the fixed contacts $B^2$. The circuit is thus established between a bussbar isolating contact J, through a horizontal conductor $J^1$ to the fixed contacts $B^2$ and thence through the contact rod D, contacts $E^1$, and walls of the tube $D^4$ to a feeder isolating contact $J^2$. When the piston $H^2$ reaches the end of its stroke the latch $H^6$ engages the collar $H^8$ so as to hold the pistons $H^2$ and H in the operative position. In addition the contact rod D is held in its closed position by a spring-loaded latch $D^5$ engaging a collar $D^6$ on the contact rod.

For opening the circuit-breaker the valve $H^5$ is operated to establish communication between the ports $I^2$ and $I^3$, and the valve $H^4$ is operated to establish communication between the corresponding ports $I^2$, $I^4$. The pressure of the gas admitted to the cylinder $H^3$ by the valve $H^4$ acts on and releases the latch $H^6$ so that the piston $H^2$ moves to the right as viewed in Figures 2 and 7. Operating liquid is thus drawn by the piston H through the pipe $E^5$ and is delivered under pressure through the pipe $E^4$. The resulting increase of pressure in the cavity $E^2$ acts on and releases the latch $D^5$ so that the plunger $D^2$ and therefore the contact rod D is moved downwards into the position shown in Figure 1.

As will be seen from Figures 2 and 7, the piston H covers the recess $G^4$ or $G^5$ slightly before it reaches the corresponding end of its stroke. A dashpot action is thus provided to bring the actuating piston to rest without shock.

The cross-sectional areas at the opposite ends of the hydraulic actuating piston H are chosen to suit the effective areas at the upper and lower ends of the plunger $D^2$ so that the operating strokes of the actuating piston H will be equal to one another.

A certain degree of leakage is permitted past the glands $G^6$, $G^7$ between the interior of the liquid reservoir and the interior of the cylinder $G^1$ so that expansion or contraction of the liquid on either side of the piston H will be automatically compensated for. The actuating piston H may have a diameter such that the volume of oil delivered is slightly in excess of that required to produce the full movement of the contact rod D. The cross-section available for leakage of liquid from the cylinder $G^1$ to the reservoir is so small that the amount of leakage which takes place during the operating strokes is negligible and is amply compensated for by the excess volume delivered by the actuating piston H. If desired non-return valves may be provided to permit free flow of liquid from the reservoir during the suction strokes of the piston H to ensure complete filling of the actuating cylinder before each operating stroke.

Figure 3:
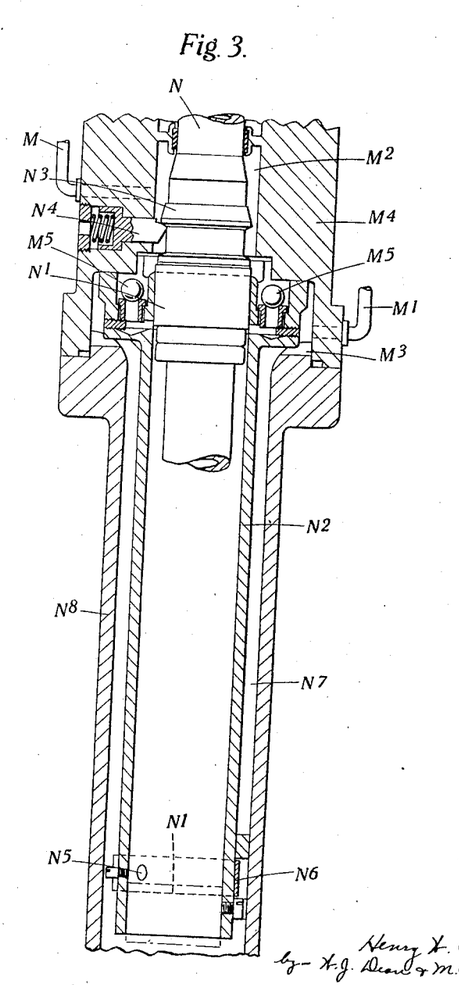
Figure 3 is a vertical section on an enlarged scale of a modified arrangement of the movable contact rod.

Figure 3 shows on an enlarged scale a modified arrangement of the moving contact rod. According to this modification the two pipes M and $M^1$ containing the liquid columns communicate respectively with cavities $M^2$ and $M^3$ within a housing $M^4$. The movable contact rod N is furnished with a piston $N^1$ which can slide within a cylinder $N^2$ and also with a collar $N^3$ arranged to cooperate with a spring-loaded latch $N^4$. The upper end of the cylinder $N^2$ communicates with the cavity $M^2$ past ball valves $M^5$ whilst the cylinder $N^2$ is furnished with ports $N^5$ controlled by an annular plate valve $N^6$ carried by the cylinder $N^2$.

With the moving contact rod N in the closed position shown, the interior of the cylinder $N^2$ can communicate past the ball valves $M^5$ with the cavity $M^2$ and pipe M, whilst the interior of the cylinder $N^2$ can also communicate through the ports $N^5$ and past the plate valve $N^6$ with an annular chamber $N^7$ leading to the cavity $M^3$ and formed between the cylinder $N^2$ and an extension tube $N^8$. If now it is desired to move the rod N into the open position suction is applied by the hydraulic piston H to the liquid in the pipe $M^1$ and pressure to the liquid in the pipe M. The resulting increase of pressure within the cavity $M^2$ causes the latch $N^4$ to release the rod N which is thus moved downwards until at the lower end of its stroke it passes over and leaves uncovered the ports $N^5$. Thus the interior of the cylinder $N^2$ above the piston $N^1$ is again in communication not only past the ball valves $M^5$ with the cavity $M^2$ and pipe M, but also through the ports $N^5$ and plate valve $N^6$ with the cavity $M^3$ and pipe $M^1$. In this way, though the actuating hydraulic piston may at each stroke deliver a quantity of liquid in excess of that necessary to move the contact rod through the desired stroke, such excess will, at the end of each stroke of the piston $N^1$, be returned from one liquid column into the other liquid column.

When the movable contact rod N is to be returned into the closed positions shown, the hydraulic actuating piston applies suction to the liquid in the pipe M and pressure to the liquid in the pipe $M^1$ so that the piston $N^1$ is returned from the position shown dotted in the drawing to the position shown in full line.

It will be seen that the moving contact rod D is extended beyond the plunger $D^2$ so that this extension passes through a liquid-tight gland $F^1$ (Figures 1 and 6) in the end of the cylinder $D^3$ in which the plunger $D^2$ slides. This has the advantage that the two working faces of the plunger $D^2$ are equal in size, thus making it possible to simplify the arrangement of the hydraulic actuating unit since the effective areas of the piston H can be of the same size and a double-acting piston can therefore be used to control the liquid columns in both the pipes $E^4$ and $E^5$.

It will be understood that the same pneumatic and hydraulic apparatus may be employed for operating a main circuit-breaker and an isolating switch in series therewith. For example, a pneumatically-operated hydraulic piston similar to that above described may be connected to two delivery ports communicating respectively with opposite sides of a plunger mounted on an isolating switch contact rod.

In some instances it may be desirable to provide means whereby operation of the contact rod or rods in one phase only can be effected independently of the other phases. To this end, as shown in Figures 2 and 7, the conduits $G^2$ and $G^3$ are furnished with rotary valves $G^8$ which are hand operated and which act, when operated, to interconnect the conduits $G^2$, $G^3$ through a by-pass $G^9$. Thus, although the actuating pistons H in the several phases will be operated the contact rod D associated with the conduits $G^2$, $G^3$ which have been by-passed by the valves $G^8$ will remain unaffected by the liquid movement. By providing one such by-pass arrangement in each phase it becomes possible to operate any selected phase independently of the other phases.

When the pneumatically-controlled hydraulic actuating device is employed in single phase or other switchgear wherein simultaneous operation of two or more contact members is not required, the arrangement may be simplified by omitting altogether the pneumatic and hydraulic pistons, the pneumatic pressure then being applied directly to the surface of the hydraulic operating liquid itself. One such arrangement is shown diagrammatically and by way of example in Figure 4, in which the contact rod K is furnished with a plunger $K^1$ arranged within a cylinder $K^2$ and two closed chambers L and $L^1$ communicate through pipes $L^2$ and $L^3$ with the cylinder $K^2$ above and below the plunger $K^1$ respectively. Gas under pressure can be supplied respectively to the closed chambers L and $L^1$ by means of two valves $L^4$ and $L^5$ whose operation is interlocked so that when the valve $L^4$ establishes communication between a supply of gas under pressure and the chamber L the valve $L^5$ establishes communication between the chamber $L^1$ and the atmosphere, whereas when the valve $L^5$ establishes communication between the chamber $L^1$ and the supply of gas under pressure, the valve $L^4$ establishes communication between the chamber L and the atmosphere.

Figure 4:
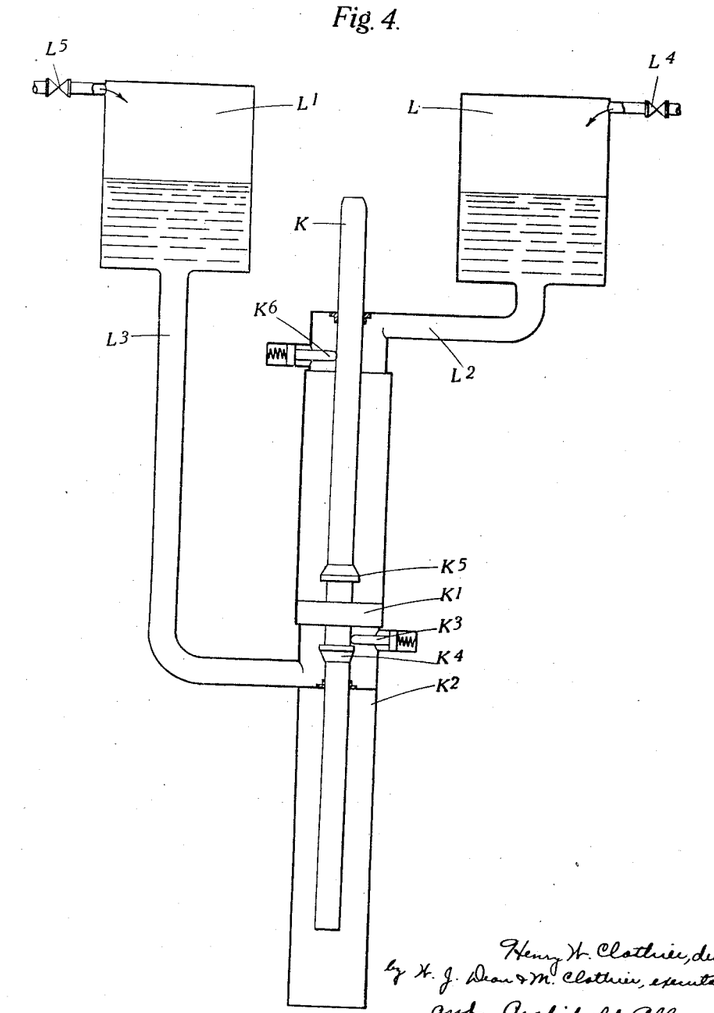
Figure 4 illustrates diagrammatically one arrangement in which the gas pressure is applied directly to the free surfaces of the liquid columns for operating the contact rod.
Figure 5:
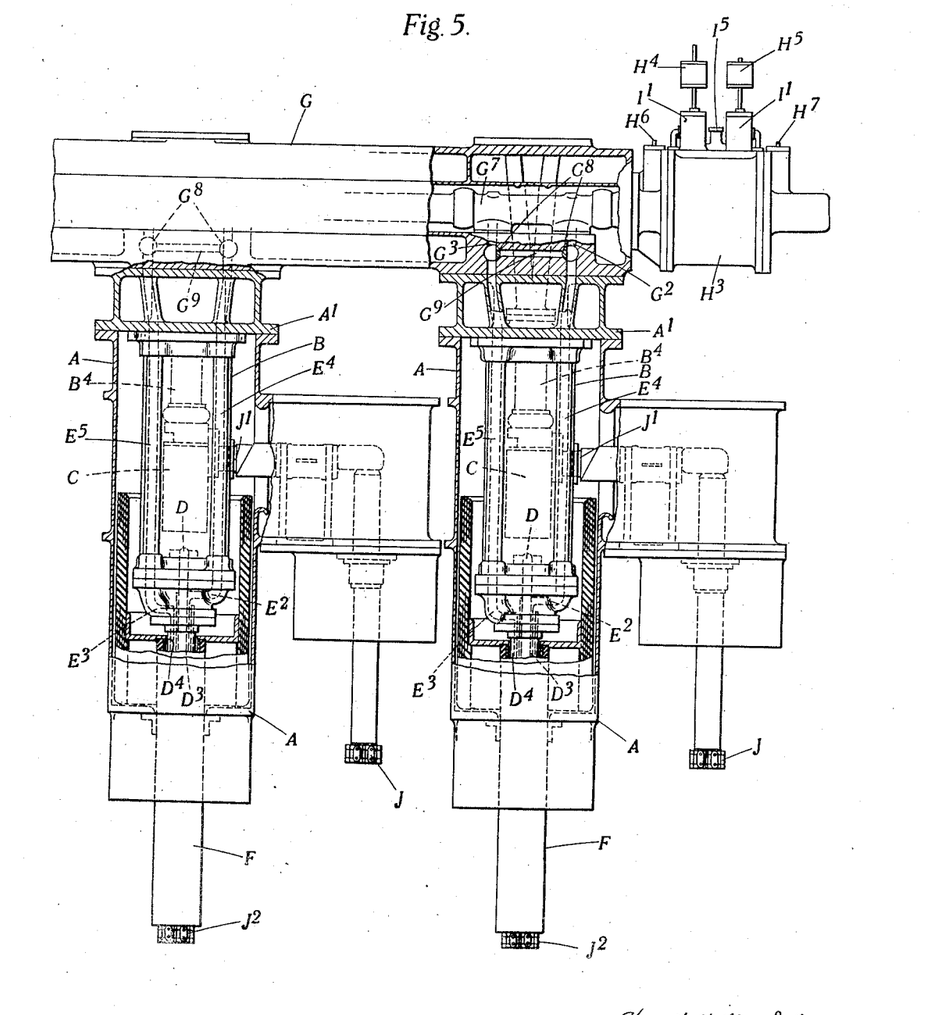
Figure 5 is a side elevation, partly in section, of two of the circuit-breakers as shown in Figure 1 assembled with the common hydraulic mechanism shown in Figure 2.

When gas under pressure is admitted to the chamber L so as to act directly on the free surface of the liquid therein, the plunger $K^1$ is moved downwards into the position shown and a spring-loaded latch $K^3$ engages a collar $K^4$ on the plunger K so as to hold this in position. When the moving contact rod K is to be moved into the closed position gas under pressure is admitted to the chamber $L^1$ so as to act directly on the free surface of the liquid therein. The latch $K^3$ is thus released by the liquid pressure and the plunger $K^1$ is moved upwards until a collar $K^5$ engages behind a spring-loaded latch $K^6$.

It will be appreciated that the constructions described above are given by way of example only and that details may be modified without departing from the spirit of the invention.

For example, the circuit-breaker may be arranged with the moving contact rod other than vertical, and the extension tube may be arranged in various ways in relation to the circuit-breaker tank. The two pipes conveying the operating liquid to the extension tube may lead to opposite ends of the extension tube, thus simplifying the construction of the tube since the tube itself may constitute the cylinder for the piston on the moving contact rod.

What we claim as our invention and desire to secure by Letters Patent is:

1. In electric switchgear, in combination, a self-contained single-break circuit-breaker unit comprising an arc-control device and a fixed circuit-breaker contact surrounded by the arc-control device, a tank wherein the said unit is immersed in insulating liquid, a cylinder, a rod of light construction housed within said cylinder and constituting the movable contact member of the circuit-breaker, at least one conduit containing a column of insulating liquid acting on the rod, and means whereby a force derived from gas under pressure is transmitted through the liquid column to the rod for effecting operation thereof.

2. In electric switchgear, in combination, a circuit-breaker, a fixed circuit-breaker contact, a movable circuit-breaker contact cooperating with the fixed contact, a plunger carried by the movable contact, a cylinder within which the plunger can reciprocate, two conduits communicating respectively with the said cylinder on opposite sides of the plunger, each conduit containing a column of insulating liquid and communicating with a hydraulic actuating cylinder containing an actuating piston, and means whereby the said actuating piston is operated by a force derived from gas under pressure, the said force being thus transmitted through the liquid columns for effecting operation of the plunger and movable contact.

3. In electric switchgear, in combination, a circuit-breaker, a fixed circuit-breaker contact, a movable circuit-breaker contact cooperating with the fixed contact, a plunger carried by the movable contact, a cylinder within which the plunger can reciprocate, two conduits communicating respectively with the said cylinder on opposite sides of the plunger, each conduit containing a column of insulating liquid and communicating with an actuating cylinder containing an hydraulic actuating piston, a pneumatically operated piston connected to the hydraulic actuating piston, a cylinder within which the pneumatic piston can reciprocate, and means for supplying gas under pressure to the pneumatic cylinder whereby force derived from the said gas under pressure is transmitted through the liquid columns for effecting operation of the plunger and movable contact.

4. In electric switchgear, in combination, a circuit-breaker, a fixed circuit-breaker contact, a movable circuit-breaker contact cooperating with the fixed contact, a plunger carried by the movable contact, a cylinder within which the plunger can reciprocate, two conduits communicating respectively with the said cylinder on opposite sides of the plunger, each conduit containing a column of insulating liquid, an hydraulic actuating cylinder; a double-acting hydraulic piston within the said actuating cylinder with which the two conduits communicate on opposite sides of the actuating piston, a pneumatic cylinder containing a double-acting pneumatic piston connected to the hydraulic actuating piston, and means for supplying gas under pressure to the pneumatic cylinder so that the force derived from the gas under pressure is transmitted through the liquid columns for effecting operation of the plunger and movable contact.

5. In electric switchgear, in combination, a circuit-breaker, a fixed circuit-breaker contact, a movable circuit-breaker contact cooperating with the fixed contact, a plunger carried by the movable contact, a cylinder within which the plunger can reciprocate, two conduits communicating respectively with the said cylinder on opposite sides of the plunger, each conduit containing a column of insulating liquid, means whereby when the plunger is at the end of an operating stroke the liquid columns are free to expand or contract without altering their effective lengths, and means whereby a force derived from gas under pressure is transmitted through the liquid columns for effecting operation of the plunger and movable contact.

6. In electric switchgear, in combination, a circuit-breaker, a fixed circuit-breaker contact, a movable circuit-breaker contact cooperating with the fixed contact, a plunger carried by the movable contact, a cylinder within which the plunger can reciprocate, two conduits communicating respectively with the said cylinder on opposite sides of the plunger, each conduit containing a column of insulating liquid and communicating with a cylinder containing an hydraulic actuating piston, at least one non-return valve past which the two conduits are brought into communication with each other, at least in one direction of flow, at the end of an operating stroke of the plunger, a pneumatic cylinder containing a piston connected to the hydraulic actuating piston which, when operated, delivers a quantity of liquid greater than that necessary for moving the plunger through the desired stroke, and means for supplying gas under pressure to the pneumatic cylinder.

7. In electric switchgear for polyphase working, in combination, a plurality of circuit-breakers each comprising a fixed circuit-breaker contact, a movable circuit-breaker contact cooperating with the fixed contact, a plunger carried by the movable contact, a cylinder within which the plunger can reciprocate, two conduits communicating respectively with the said cylinder on opposite sides of the plunger, each conduit containing a column of insulating liquid and communicating with an hydraulic cylinder on opposite sides of an hydraulic actuating piston, a single rod carrying the several hydraulic actuating pistons, at least one pneumatically operated piston connected to the said rod, a cylinder within which the pneumatic piston can reciprocate, means for supplying gas under pressure to the pneumatic cylinder whereby force derived from the said gas under pressure is transmitted through the liquid columns for effecting synchronous operation of the plungers and movable contacts of the several circuit-breakers, and at least one by-pass valve arranged between each hydraulic actuating cylinder and the cylinder containing the plunger of the corresponding moving contact, the said by-pass valve being actuated at will to render the hydraulic actuating piston inoperative on the associated circuit-breaker.

8. In an electric switch gear, in combination, a circuit breaker, a fixed circuit breaker contact, a movable circuit breaker contact cooperating with the fixed contact, a plunger carried by the movable contact, a cylinder within which the plunger can reciprocate, two conduits communicating respectively with the said cylinder on opposite sides of said plunger, each conduit containing a column of insulating liquid and communicating with a hydraulic actuating device therefor, a pneumatically actuated device, and means directly connecting said devices whereby hydraulic pressure is transmitted through the liquid columns for effecting operation of the plunger and movable contact.

9. In an electric switch gear, in combination, a circuit breaker, a fixed circuit breaker contact, a movable circuit breaker contact cooperating with the fixed contact, a plunger carried by the movable contact, a cylinder within which the plunger can reciprocate, two conduits communicating respectively with the said cylinder on opposite sides of said plunger, each conduit containing a column of insulating liquid, a source of gas under pressure, a device adapted to be operated by the pressure of said gas, a hydraulic actuating device driven by said gas actuated device, and means for delivering insulating fluid under pressure from said second mentioned device to either of said liquid columns for effecting operation of the plunger and movable contact.

WALTER JAMES DEAN,
MARY CLOTHIER,
*Executors of the Estate of Henry William Clothier, Deceased.*
ARCHIBALD ALLAN.